G. TEICHNER.
PROCESS FOR ELECTROLYTICALLY PRODUCING PEROXID OF HYDROGEN.
APPLICATION FILED DEC. 28, 1905.
916,900.
Patented Mar. 30, 1909.
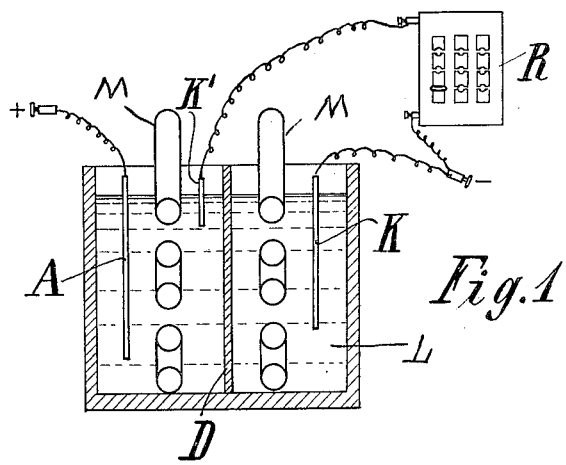
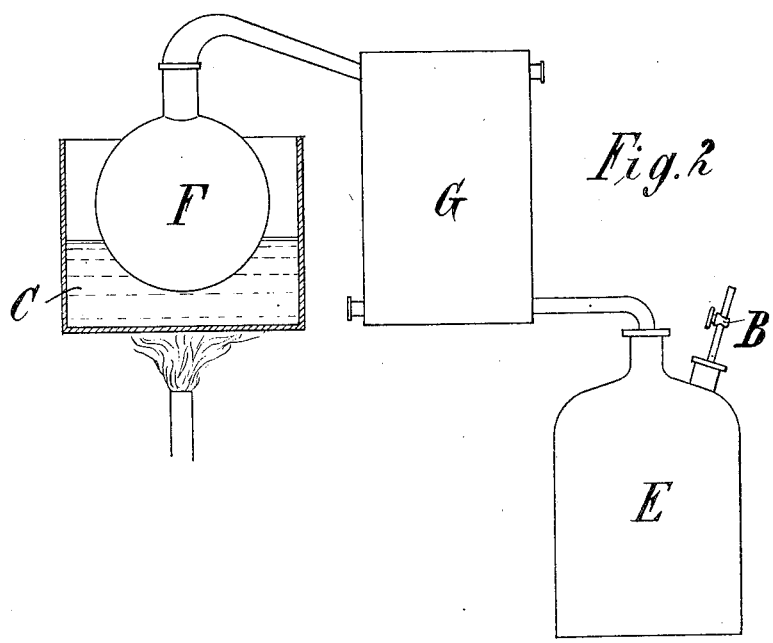
Witnesses:
Inventor:
Gustav Teichner
by Spear, Middleton,
Donaldson & Spear
Attorney

UNITED STATES PATENT OFFICE.

GUSTAV TEICHNER, OF NUREMBERG, GERMANY.

PROCESS FOR ELECTROLYTICALLY PRODUCING PEROXID OF HYDROGEN.

No. 916,900.   Specification of Letters Patent.   Patented March 30, 1909.

Application filed December 28, 1905. Serial No. 293,677.

*To all whom it may concern:*

Be it known that I, GUSTAV TEICHNER, a subject of the Emperor of Austria-Hungary, residing at No. 54 Gugelstrasse, Nuremberg, Bavaria, Germany, have invented new and useful Improvements in the Process for Electrolytically Producing Peroxid of Hydrogen, of which the following is a description.

The present invention consists of a process for electrolytically producing peroxid of hydrogen.

As is well known peroxid of hydrogen cannot be obtained in large quantities by means of electrolysis, because it is decomposed at the anode, oxygen being developed. It is also known that persulfuric acid like its salts, which may be easily obtained by electrolysis is converted by strong acids first into the so-called "Caro-acid" and then yield peroxid of hydrogen. This reaction, which would permit the indirect electrolytical production of peroxid of hydrogen, has hitherto not been adapted for employment in the technical production of the same, because no one had succeeded in isolating the peroxid of hydrogen from its solution in sulfuric acid. The conversion can only be effected quickly and properly in strong acid solutions, and since, in addition to this, sulfuric acid is developed in the reaction itself, a solution is finally obtained, which may contain up to 80% of sulfuric acid, with relatively small quantities of peroxid of hydrogen. The difficulty is due to the fact that peroxid of hydrogen reacts with sulfuric acid to generate a body of uncertain composition, though possibly represented by $H_2S_2O_9$, which is generally known as "Caro acid," and the quantity of which depends on the temperature and acidity of the solution. Now, peroxid of hydrogen and the Caro-acid easily act on each other generating oxygen and the slightest quantity of any catalytic agent will be sufficient to effect mutual decomposition. According to experiments by Price and Friend (*Journ. Chem. Soc. London*, vol. 95, p. 1526) the sensitiveness of such solutions with regard to catalytic agents is much greater than that of peroxid of hydrogen solutions alone, and on warming the same, an intense generation of oxygen generally takes place. For this reason the conversion of the persulfuric acid into peroxid of hydrogen has always been accompanied by a very considerable loss of oxygen, and it has hitherto been quite impossible to separate the peroxid of hydrogen from the sulfuric acid. The method ordinarily employed for purifying peroxid of hydrogen by precipitating the sulfuric acid with baryta etc., is of course quite impracticable in the present case owing to the large quantities of sulfuric acid.

Now my experiments have shown that the decomposition of the above named solutions may be almost entirely avoided by avoiding any trace whatever of catalytic agents and that if pure solutions are employed, not only will the conversion of the persulfuric acid into peroxid of hydrogen take place more advantageously, but it will even be possible to separate the peroxid of hydrogen produced from the accompanying sulfuric acid by various methods and practically without loss.

Regarding the conversion of persulfuric acid into hydrogen peroxid, Elbs has found (*Zeitschrift der Elektrochemie I*, page 471) that at ordinary room temperature it takes place very slowly and is accompanied by considerable loss of oxygen. Elbs accelerated the conversion by heating, but this involved the decomposition of about 80% of the persulfuric acid, oxygen being developed. I, on the other hand, have succeeded in converting a solution of 21 gr. of persulfuric acid in 100 cubic centimeters of a sulfuric acid of 1.4 specific gravity, absolutely free from catalytic agents at 50° C. in 45 minutes and with a loss of only 3% of the oxygen into an equivalent solution of peroxid of hydrogen.

For the purposes of the present specification I use the expression "persulfuric acid is converted into peroxid of hydrogen" for the sake of brevity, to be quite exact, it would be necessary to continually repeat that the persulfuric acid is decomposed, yielding sulfuric acid and peroxid of hydrogen.

The peroxid of hydrogen formed may be separated from the accompanying large quantities of sulfuric acid in various ways. Extraction with various solvents and distillation have proved to be the most suitable way.

The extraction is advantageously effected by means of sulfuric or acetic ether, since these leave the sulfuric and Caro acids almost entirely undissolved and are not noticeably attacked by them. By employing continuously working extracting apparatus on the Soxhlet principle or similar ones, the peroxid of hydrogen can be completely extracted with relatively small quantities of ether, and in this manner it is obtained in the form of pure and absolutely stable solutions of any desired concentration.

Distillation when employed should be carried out as quickly as possible and at the lowest possible temperature. It is advantageous to work *in vacuo* and the driving out of the peroxid of hydrogen may be accelerated by feeding in a current of steam or of an indifferent gas such as ether vapor. The loss of oxygen during the distillation depends on the degree of purity of the solutions. While in the presence of catalytic agents a large proportion of the peroxid of hydrogen is decomposed during the course of the distillation, it can be forced over into the receiver entirely without the least decomposition when distilling pure solutions. If the distillation is properly conducted, no sulfuric acid will pass over and consequently the peroxid of hydrogen will be obtained in an absolutely pure and therefore very stable condition. Since the amount of peroxid of hydrogen contained in the products of distillation increases during the distillation, it is possible to obtain distillates of very high concentration, by separately collecting the various fractions.

There is a difficulty in keeping the solutions as absolutely pure as they should be in order to attain a good output, due to the fact that in producing persulfuric acid electrolytically, a small quantity of the platinum employed as metal anode dissolves, and this platinum owing to its great catalytic effect, unfavorably influences the yield of peroxid of hydrogen. It has been found that this disadvantage may be avoided by electrolytically precipitating the platinum out of the solution. This precipitation may be combined with the main electrolysis by placing an auxiliary cathode in the anode chamber through which a small fraction of the main current should be allowed to pass. Instead of the electrolysis, the platinum may be eliminated by means of suitable chemical operations or by distilling the sulfuric acid. In this manner solutions will be obtained which are eminently suited for the production of peroxid of hydrogen, and enable the same to be obtained practically without loss. It has further been found that it is not necessary to wait until the persulfuric acid has been converted into peroxid of hydrogen before carrying out the distillation of the latter. The persulfuric acid solution obtained by electrolysis or by the action of sulfuric acid on persulfates or in any other way, may be distilled at once. Since at a distilling temperature of for instance 60° C. and owing to the continuous removal of the peroxid of hydrogen formed, the speed of conversion is extremely high, it is possible in a very short time to lead the whole of the peroxid obtainable from the persulfuric acid into the receptacle. In the same manner the formation of peroxid from persulfuric acid may be combined with the extraction of the former by means of the above named dissolving agents.

The solutions freed from the peroxid of hydrogen in the manner described or in other ways may be subjected again to electrolytic oxidation, after having been brought back to the original strength so that the persulfuric acid will simply serve as a transmitter of oxygen and the peroxid of hydrogen will be formed by an uninterrupted cyclic process by indirect oxidation of water.

In restoring the original strength of the acid, water is added and in the next electrolysis this water is converted into hydrogen peroxid.

Instead of persulfuric acid other electrolytically obtainable combinations of the nature of per acids may be employed analogously as oxygen transmitters. It is for instance known that the percarbonates and perborates capable of electrolyzation when dissolved in water, decompose, in forming peroxid of hydrogen. If this latter is removed from the solution by suitable methods for instance by extraction with ether, the conversion will go on to the end and the solutions freed from the peroxid of hydrogen may be subjected again to electrolysis. In this way also peroxid of hydrogen may be obtained by indirect oxidation of water.

In the accompanying illustration, I have shown, more or less diagrammatically, certain apparatus adapted for use in the described process.

In this showing:—Figure 1 is a view in vertical section of a cell containing an auxiliary cathode; and Fig. 2 is a view, partly in elevation and partly in vertical section, of a device adapted for use in distillation.

In Fig. 1, A is a platinum anode; K is a cathode, which may be made of graphite or other suitable material; K' is an auxiliary cathode, which may also be made of graphite; D is a diagram and R is a regulating rheostat; L designates the electrolyte and M—M temperature regulating coils.

In Fig. 2, C is an oil or water bath; F is a still; G a condenser and E a receiver provided with a valved pipe B through which a vacuum connection may be made.

The distillation apparatus is advantageously made of, or lined with, glass, porcelain, enameled steel or other resistant material to avoid decomposing the hydrogen peroxid.

I claim as my invention:—

1. A process for producing peroxid of hydrogen, which consists in forming peroxid of hydrogen from persulfuric acid and subsequently separating the peroxid of hydrogen from the sulfuric acid produced.

2. A process for producing peroxid of hydrogen, which consists in forming peroxid of hydrogen from persulfuric acid practically free from catalytic agents at a temperature of not less than 30° C. and subsequently separating the peroxid for hydrogen from the sulfuric acid produced.

3. A process for producing peroxid of hydrogen, which consists in forming peroxid of hydrogen from persulfuric acid practically free from catalytic agents at a temperature of not less than 30° C. and isolating the peroxid of hydrogen from the accompanying sulfuric acid by extraction.

4. A process for producing peroxid of hydrogen, which consists in subjecting solutions of persulfuric acid practically free from catalytic agents, in a heated condition, to an extracting process, during such extraction gradually forming peroxid of hydrogen and separating out the latter as it is formed.

5. A process for producing peroxid of hydrogen which consists of forming peroxid of hydrogen from persulfuric acid practically free from catalytic agents and isolating the peroxid of hydrogen from the accompanying sulfuric acid by distillation.

6. A process for producing peroxid of hydrogen, which consists in distilling a solution of persulfuric acid practically free from catalytic agents while continuously producing peroxid of hydrogen therein, thus separating out the peroxid of hydrogen as it is formed.

7. A process of producing peroxid of hydrogen which consists in electrolytically preparing persulfuric acid, removing dissolved anode metal, forming peroxid of hydrogen from the purified acid and separating such peroxid from the sulfuric acid produced.

8. A process of producing peroxid of hydrogen which consists in electrolytically forming persulfuric acid, forming hydrogen peroxid therefrom with production of sulfuric acid and re-forming persulfuric acid from such sulfuric acid, electrolytically in continuous cycle.

9. A process of producing peroxid of hydrogen which consists in electrolytically preparing persulfuric acid, during electrolysis eliminating any dissolved anode metal, forming hydrogen peroxid from the purified acid and isolating such peroxid.

10. A process of producing peroxid of hydrogen which consists in electrolytically preparing a per acid, forming peroxid of hydrogen therefrom with reformation of the original acid and reforming the per acid from such acid electrolytically in continuous cycle.

In testimony whereof I affix my signature in the presence of two witnesses.

GUSTAV TEICHNER.

Witnesses:
LUDWIG SCUMINGER,
KARL KOTTMUNN.